United States Patent
Aleid et al.

(10) Patent No.: US 11,599,955 B2
(45) Date of Patent: Mar. 7, 2023

(54) SYSTEMS AND METHODS FOR EVALUATING AND SELECTING COMPLETION EQUIPMENT USING A NEURAL NETWORK

(71) Applicant: Saudi Arabian Oil Company, Dhahran (SA)

(72) Inventors: Abdulrahman K. Aleid, Dhahran (SA); Yaser A. Alabdulhadi, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 125 days.

(21) Appl. No.: 17/140,221

(22) Filed: Jan. 4, 2021

(65) Prior Publication Data

US 2022/0213779 A1 Jul. 7, 2022

(51) Int. Cl.
| | |
|---|---|
| *G06Q 10/06* | (2012.01) |
| *G06Q 50/02* | (2012.01) |
| *G06K 9/62* | (2022.01) |
| *G06N 3/08* | (2023.01) |
| *G06Q 10/0631* | (2023.01) |

(52) U.S. Cl.
CPC ........... *G06Q 50/02* (2013.01); *G06K 9/6256* (2013.01); *G06N 3/08* (2013.01); *G06Q 10/06313* (2013.01)

(58) Field of Classification Search
None
See application file for complete search history.

(56) References Cited

U.S. PATENT DOCUMENTS

| | | |
|---|---|---|
| 4,593,560 A | 6/1986 | Purfurst |
| 5,987,385 A | 11/1999 | Varsamis et al. |
| 7,013,992 B2 | 3/2006 | Tessari et al. |
| (Continued) | | |

FOREIGN PATENT DOCUMENTS

| | | |
|---|---|---|
| CN | 2386178 | 7/2000 |
| CN | 103015899 | 4/2013 |
| (Continued) | | |

OTHER PUBLICATIONS

Bansal et al. ("Mapping Completion Design Trends in a Compartmentalized Tight Oil Reservoir for Rapid Evaluation Using Artificial Neural Networks," SPE-188495-MS, Paper presented at the Abu Dhabi International Petroleum Exhibition & Conference, Abu Dhabi, UAE, Nov. 2017, 11 pages).*

(Continued)

*Primary Examiner* — Matthew D Henry
(74) *Attorney, Agent, or Firm* — Fish & Richardson P.C.

(57) ABSTRACT

In an example method, a system obtains first data indicating a plurality of properties of a wellbore, and determines a plurality of types of completion equipment available for deployment at the wellbore. Further, the system determines, using a computerized neural network, a plurality of quality metrics based on the first data. Each of the quality metrics represents an estimated likelihood of success of operating a respective one of the types of completion equipment at the wellbore. Further, the system causes a graphical user interface to be displayed to a user. The graphical user interface includes a concurrent presentation of an indication of each of the types of completion equipment, and an indication of each of the quality metrics.

18 Claims, 8 Drawing Sheets

(56) References Cited

U.S. PATENT DOCUMENTS

| | | |
|---|---|---|
| 7,823,663 B2 | 11/2010 | Eddison |
| 8,936,009 B2 | 1/2015 | Hu |
| 9,611,697 B2 | 4/2017 | Radford et al. |
| 10,113,408 B2 | 10/2018 | Pobedinski et al. |
| 11,276,127 B1 * | 3/2022 | Stevens .................. G06N 3/08 |
| 2008/0308279 A1 | 12/2008 | Zazovsky et al. |
| 2011/0088903 A1 | 4/2011 | Onadeko et al. |
| 2014/0067353 A1 | 3/2014 | Shelley et al. |
| 2017/0096881 A1 | 4/2017 | Dusterhoft et al. |
| 2018/0171774 A1 | 6/2018 | Ringer et al. |
| 2018/0230767 A1 | 8/2018 | Sehsah et al. |
| 2019/0301244 A1 | 10/2019 | Moore et al. |
| 2019/0368295 A1 | 12/2019 | Machocki et al. |
| 2020/0284944 A1 | 9/2020 | Madasu et al. |
| 2021/0131235 A1 * | 5/2021 | Russell .................. E21B 47/06 |
| 2022/0114302 A1 * | 4/2022 | Skripkin ................ G06F 30/20 |

FOREIGN PATENT DOCUMENTS

| | | |
|---|---|---|
| EP | 1201873 | 4/2005 |
| RU | 2663011 | 8/2018 |
| WO | WO 2012039630 | 3/2012 |
| WO | WO 2013136113 | 9/2013 |
| WO | WO 2018116140 | 6/2018 |

OTHER PUBLICATIONS

PCT International Search Report and Written Opinion in International Appln. No. PCT/US2022/011150, dated Apr. 14, 2022, 16 pages.

Chen, "Application of Machine Learning Methods to Predict Well Productivity in Montney and Duvernay," University of Calgary, Department of Chemical and Petroleum Engineering, Schulich School of Engineering, Apr. 16, 2019, 42 pages.

* cited by examiner

FIG. 5A

Completion Equipment Performance System (CEPS)

| Field | Well Application | Well Trajectory | Reservoir | H2S concentration | Fluid properties | Hole Section | Depth |
|---|---|---|---|---|---|---|---|
| Chose | Oil/Gas | Horizontal/Vertical | Chose the reservoir | Percentage % | density, viscosity, API gravity, water salinity | Targeted hole section | MD |

→ 502

504 → Click on apply — Apply

Approved Equipment (Based on the previous inputs)

Fit for purpose equipment will appear along with its service provider. Select one

Remarks

After selecting one of the displayed equipment, a feedback will appear in this section about the selected technology performance and its status 510 → Click on apply — Apply

Specs Data (Based on the previous inputs)   506

Technical / Specs data of the selected technology will appear in the section

Best Practices (Based on the previous inputs)

Running procedure and recommended parameters will appear in this section

| Well Name | X | Y | Well Application | Well trajectory | Formation | Depth Interval (ft) | Completion | Success factor |
|---|---|---|---|---|---|---|---|---|
| Well 1 | 1000 | 1200 | Oil | Horizontal | Sandstone | 12000 | Sand Screen | 0.66 |
|  |  |  |  |  |  |  | MSF | 0.10 |
|  |  |  |  |  |  |  | Open Hole | 0.23 |
|  |  |  |  |  |  |  | Perforation | 0.01 |
| Well 2 | 1050 | 1100 | Gas | Horizontal | Shale | 14000 | MSF | 0.85 |
|  |  |  |  |  |  |  | Sand Screen | 0.04 |
|  |  |  |  |  |  |  | Open hole | 0.01 |
|  |  |  |  |  |  |  | Perforation | 0.10 |

FIG. 5B

SYSTEMS AND METHODS FOR EVALUATING AND SELECTING COMPLETION EQUIPMENT USING A NEURAL NETWORK

TECHNICAL FIELD

The disclosure relates to systems and methods for evaluating and selecting completion equipment for wellbores using a neural network.

BACKGROUND

A well is used to bring natural resources, such as oil or natural gas, from a subsurface formation to the surface of the earth. A well can be created and utilized according to several stages, including a drilling stage, a completion stage, and a production stage.

During the drilling stage, a wellbore is formed by drilling a hole through the surface of the earth and through a portion of the subsurface formation, such that the contents of the subsurface formation can be accessed. Further, the wellbore can be reinforced, for example by installing casing or pipe along its length.

During the completion stage, the well is made ready for production. For example, the bottom of the wellbore can be prepared to particular specifications. As another example, production tubing and other downhole tools can be installed in or around the wellbore to facilitate the extraction of natural resources from the well.

During the production stage, natural resources are extracted from the subsurface formation and brought to the surface of the earth. For example, oil or natural gas contained within the subsurface formation can be brought to the surface of the earth, such that they can be refined and used as sources of energy or used as a part of other industrial applications.

SUMMARY

This disclosure describes systems and methods for evaluating and selecting completion equipment for wellbores using a neural network. In an example implementation, a neural network obtains data regarding the characteristics of a wellbore, processes the data to determine a likelihood of success of operating each of several types of completion equipment at the wellbore, and presents the processed data to a user for review. In some implementations, the neural network can automatically select a particular type of completion equipment that is most suitable for operation at the wellbore based on the processed data, and present the selection to a user. In some implementations, the neural network can present the processed data to a user to assist the user in manually selecting completion equipment for the wellbore.

The implementations described in this disclosure can provide various technical benefits. For instance, a neural network can enable wells to be produced more quickly and efficiently. For example, the neural network can identify types of completion equipment that are likely to be operated successfully for each wellbore. Accordingly, a well can be constructed without testing several types of completion equipment for each wellbore through trial and error, which may be both time consuming and costly. As another example, the neural network can identify types of completion equipment that are likely to be efficient or effective in extracting natural resources from a subsurface formation. Accordingly, a well can be constructed such that it operates in a more efficient or more effective manner.

In an aspect, a method includes obtaining, using one or more processors, first data indicating a plurality of properties of a wellbore; determining, using the one or more processors, a plurality of types of completion equipment available for deployment at the wellbore; determining, using the one or more processors implementing a computerized neural network, a plurality of quality metrics based on the first data, where each of the quality metrics represents an estimated likelihood of success of operating a respective one of the types of completion equipment at the wellbore; and causing, using the one or more processors, a graphical user interface to be displayed to a user, the graphical user interface including a concurrent presentation of: an indication of each of the types of completion equipment, and an indication of each of the quality metrics.

Implementations of this aspect can include one or more of the following features.

In some implementations, the method can further include selecting, using the one more processors based on the quality metrics, a first type of completion equipment from among the types of completion equipment for deployment at the wellbore. The graphical user interface can further include an indication of selection of the first type of completion equipment.

In some implementations, the method can further include training the computerized neural network based on second data regarding one or more additional wellbores. The second data can include, for each of the additional wellbores: an indication of a plurality of properties of the additional wellbore, an indication of one of the types of completion equipment deployed at the additional wellbore, and an indication of an additional quality metric for the type of completion equipment deployed at the additional wellbore.

In some implementations, training the computerized neural network can include determining a transfer function based on the second data. The transfer function can define a relationship between a plurality of inputs to the computerized neural network and a plurality of outputs of the computerized neural network. Each of the inputs can correspond to a different respect one of the properties of the wellbore. Each of the outputs can correspond to a different one of the quality metrics.

In some implementations, the transfer function can define one or more weights associated with determining the outputs based on the inputs.

In some implementations, obtaining the first data can include determining an indication of a resource to be obtained from the wellbore. The resource can be at least one of oil or gas.

In some implementations, obtaining the first data can include determining a trajectory of the wellbore. The trajectory can be horizontal or vertical.

In some implementations, obtaining the first data can include determining a composition of a formation through which the wellbore extends. The composition can include at least one of sandstone or shale.

In some implementations, obtaining the first data can include determining a depth of the wellbore.

In some implementations, the first data can include an indication of at least one of a density, a viscosity, an American Petroleum Institute (API) gravity, or a salinity of fluid in the wellbore.

In some implementations, obtaining the first data can include determining a concentration of a gas in the wellbore. The gas can be hydrogen sulfide.

In some implementations, determining the plurality of quality metrics can include determining an estimated likelihood of success of operating each of sand screen completion equipment, multistage fracturing completion equipment, open hole completion equipment, or perforation completion equipment at the wellbore.

In some implementations, at least some of the first data can be obtained by one or more sensors deployed at the wellbore.

In some implementations, at least some of the first data can be received from the user via the graphical user interface.

Other implementations are directed to systems, devices, and devices for performing some or all of the method. Other implementations are directed to one or more non-transitory computer-readable media including one or more sequences of instructions which when executed by one or more processors causes the performance of some or all of the method.

The details of one or more embodiments are set forth in the accompanying drawings and the description. Other features and advantages will be apparent from the description and drawings, and from the claims.

BRIEF DESCRIPTION OF DRAWINGS

FIGS. 5A and 5B are example graphical user interfaces (GUI) that enable a user to interact with a system for evaluating and selecting completion equipment for wellbores using a neural network.

DETAILED DESCRIPTION

Figure 1:
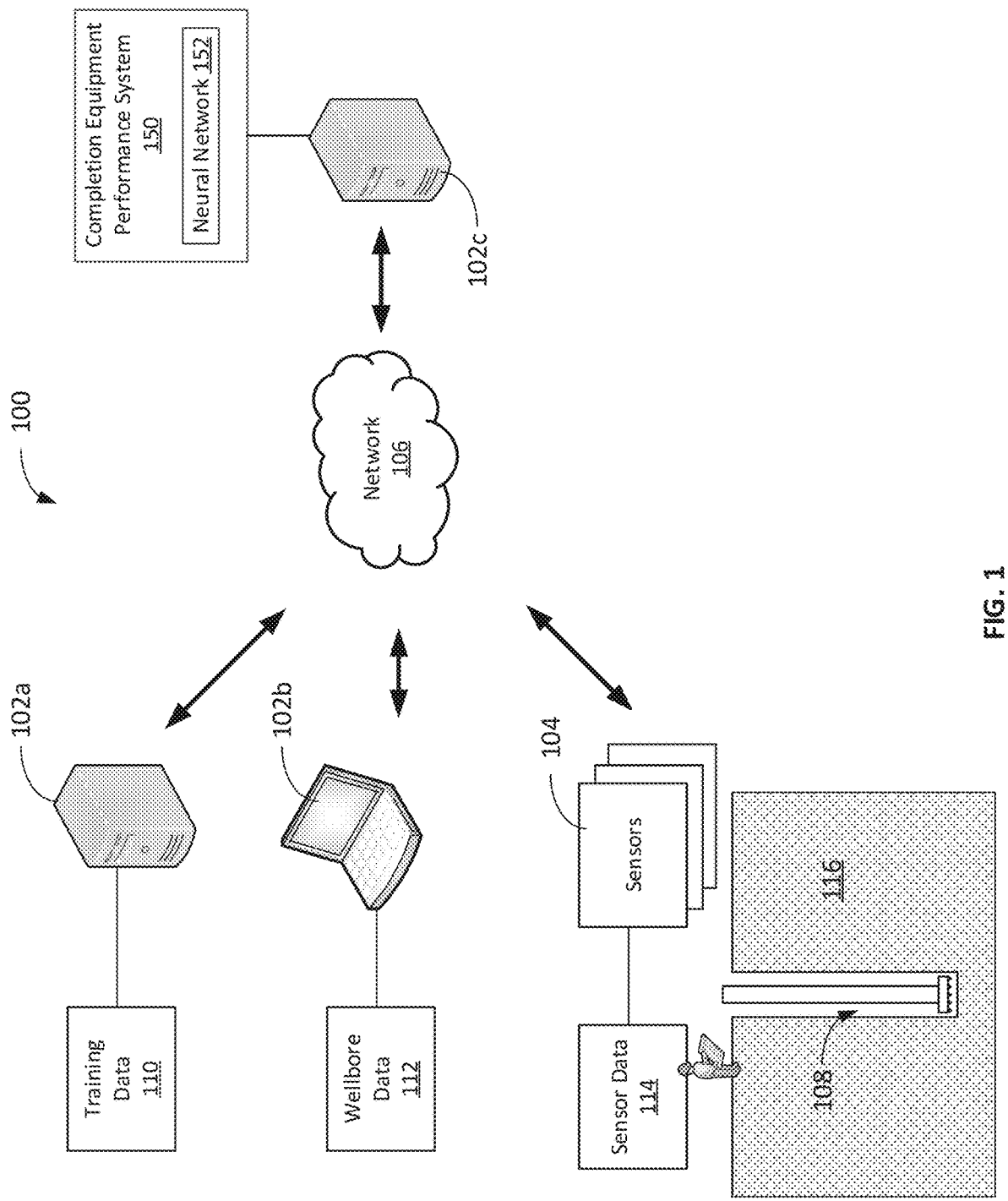
FIG. 1 is a diagram of an example system for evaluating and selecting completion equipment for wellbores using a neural network.

FIG. 1 shows an example system 100 for evaluating and selecting completion equipment for wellbores using a neural network. The system 100 includes several computer systems 102a-102c and sensors 104 communicatively coupled to one another through a network 106. Further, a completion equipment performance system 150 including a neural network 152 is maintained on at least one of the computer systems (for example, the computer system 102c).

During an operation of the system 100, the neural network 152 of the completion equipment performance system 150 is trained to evaluate and select completion equipment for wellbores using training data (for example, training data 110 from the computer system 102a). The training data 110 can include information regarding one or more wells, such as the characteristics of one or more wellbores, the subsurface formations through which those wellbores extend, the types of completion equipment that had been installed at those wellbores, and the results of the installations (for example, whether the installations were successful, whether any problems were encountered during installation, the production rates of the wells, and so forth). Further, the neural network 152 can be trained to recognized particular trends, patterns, or correlations between the characteristics of a well and its wellbore, the type completion equipment that was installed at that wellbore, and the results of that installation. Example training data and training techniques are described in further detail below.

After the neural network 152 has been trained, the completion equipment performance system 150 obtains data regarding the characteristics of a wellbore 108 from one or more of the computer system 102a-102c and the sensors 104. For example, the completion equipment performance system 105 can obtain wellbore data 112 from the computer system 102b. As another example, the completion equipment performance system 105 can obtain sensor data 114 from one or more sensors 104 positioned in or in proximity to the wellbore 108.

In some implementations, the wellbore data 112 and sensor data 114 can include information regarding the characteristics of the subsurface formation 116 through which the wellbore 108 extends, such as the composition and porosity of the subsurface formation 116. In some implementations, the wellbore data 112 and sensor data 114 can include information regarding the characteristics of a fluid or gas into the subsurface formation 116, such as the density, the viscosity, the salinity, the composition, or the concentration of the fluid or gas in the subsurface formation 116. In some implementations, the wellbore data 112 and sensor data 114 can include information regarding the characteristics of the wellbore 108 itself, such as the dimensions and trajectory of the wellbore 108. Example wellbore data 112 and sensor data 114 are described in further detail below.

Further, the completion equipment performance system 150 processes the data using the neural network 152 to determine a likelihood of success of operating each of several types of completion equipment at the wellbore 108, and presents the processed data to a user for review. For example, based on the trends, patterns, or correlations identified during the training process, the neural network 152 can estimate a likelihood of success of operating each of several types of completion equipment (for example, through an interpolation or extrapolation process). In some implementations, the completion equipment performance system 150 can automatically select a particular type of completion equipment that is most suitable for operation at the wellbore 150 based on the processed data, and present the selection to a user. In some implementations, the completion equipment performance system 150 can present the processed data to a user to assist the user in manually selecting completion equipment for the wellbore 108.

Each of the computer systems 102a-102c can include any number of electronic device that are configured to receive, process, and transmit data. Examples of the computer systems 102a-102c include client computing devices (such as desktop computers or notebook computers), server computing devices (such as server computers or cloud computing systems), mobile computing devices (such as cellular phones, smartphones, tablets, personal data assistants, notebook computers with networking capability), wearable computing devices (such as a smart phone or a headset), and other computing devices capable of receiving, processing, and transmitting data. In some implementations, the computer systems 102a-102c can include computing devices that operate using one or more operating systems (as examples, Microsoft Windows, Apple macOS, Linux, Unix, Google Android, and Apple iOS, among others) and one or more architectures (as examples, x86, PowerPC, and ARM, among others). In some implementations, one or more of the computer system 102a-102c need not be located locally with respect to the rest of the system 100, and one or more of the computer systems 102a-102c can be located in one or more remote physical locations.

Each the computer systems 102a-102c can include a respective user interface that enables users interact with the computer system 102a-102c and the completion equipment performance system 150, such as to view data from one or more of the computer systems 102a-102c or the completion equipment performance system 150, transmit data from one computer system to another, or to issue commands to one or more of the computer systems 102a-102c or the completion equipment performance system 150. Commands can include, for example, any user instruction to one or more of the computer system 102a-102c or the completion equipment performance system 150 to perform particular operations or tasks. In some implementations, a user can install a software application onto one or more of the computer systems 102a-102c to facilitate performance of these tasks.

In FIG. 1, the computer systems 102a-102c are illustrated as respective single components. However, in practice, the computer systems 102a-102c can be implemented on one or more computing devices (for example, each computing device including at least one processor such as a microprocessor or microcontroller). As an example, the computer system 102c can be a single computing device that is connected to the network 106, and the completion equipment performance system 150 can be maintained and operated on the single computing device. As another example, the computer system 102c can include multiple computing devices that are connected to the network 106, and the completion equipment performance system 150 can be maintained and operated on some or all of the computing devices. For instance, the computer system 102c can include several computing devices, and the completion equipment performance system 150 can be distributive on one or more of these computing devices.

The sensors 104 are positioned in or around the wellbore 108, and are configured to measure one or more characteristic of the wellbore 108. Example sensors 104 include temperature sensors, groundwater sensors, vapor sensors, optical sensors, vibrating or tuning fork sensors, ultrasonic sensors, float sensors, capacitance sensors, radar sensor, conductivity or resistance sensors, and any other sensors for measuring properties in and around a wellbore.

The network 106 can be any communications network through which data can be transferred and shared. For example, the network 106 can be a local area network (LAN) or a wide-area network (WAN), such as the Internet. The network 106 can be implemented using various networking interfaces, for instance wireless networking interfaces (such as Wi-Fi, Bluetooth, or infrared) or wired networking interfaces (such as Ethernet or serial connection). The network 106 also can include combinations of more than one network, and can be implemented using one or more networking interfaces.

Figure 2:
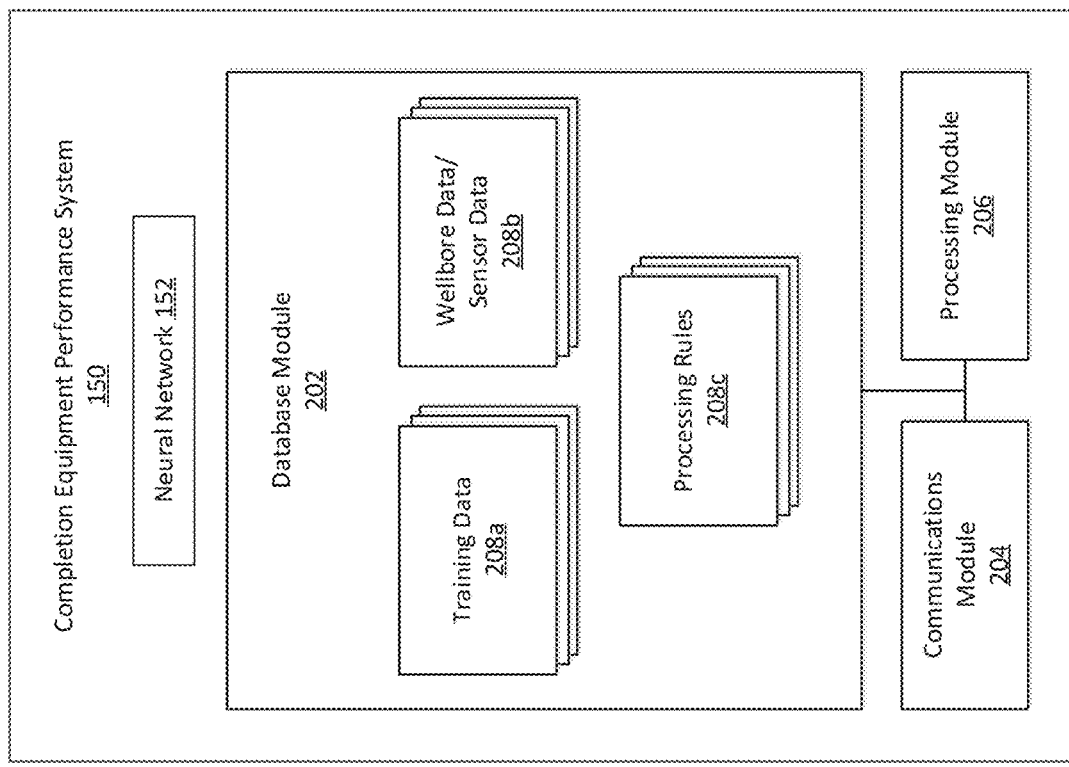
FIG. 2 is a diagram of an example completion equipment performance system.

FIG. 2 shows various aspects of the completion equipment performance system 150. The completion equipment performance system 150 includes a neural network 152 and several modules that perform particular functions related to the operation of the system 100. For example, the completion equipment performance system 150 can include a database module 202, a communications module 204, and a processing module 206.

The database module 202 maintains information related to evaluating and selecting completion equipment for wellbores using the neural network 152.

The database module 202 can store training data 208a that is used to train the neural network 152 to evaluate and select completion equipment for wellbores. The training data 208a can include historical information regarding one or more wells that were previously constructed, which can be used to train the neural network 152 to recognize particular trends, patterns, or correlations between the characteristics of a well and its wellbore, the type completion equipment that was installed at that wellbore, and the results of that installation. In some implementations, the training data 208a can be similar to the training data 110 described with respect to FIG. 1.

As an example, for each well, the training data 208a can include information regarding the characteristics of the wellbore of the well, such as the dimensions of the wellbore (for example, the diameter of the wellbore and the depth to which the wellbore extends) and the trajectory of the wellbore (for example, whether the trajectory of a wellbore is horizontal or vertical).

As another example, for each well, the training data 208a can include information regarding the characteristics of the subsurface formation through which the wellbore extends. Example information includes the composition of the subsurface formation (for example, whether the subsurface formation includes sandstone, shale, or a combination thereof) and a porosity of the subsurface formation.

As another example, for each well, the training data 208a can include information regarding the characteristics of one or more fluids or gases in the subsurface formation. Example information includes the density, the viscosity, the salinity, the composition, an American Petroleum Institute (API) gravity, and the concentration of the fluid or gas in the subsurface formation. In some implementations, the information can include the concentration of a particular substance in the subsurface formation (for example, the concentration of hydrogen sulfide gas).

As another example, for each well, the training data 208a can include information regarding the types of completion equipment that had been installed as those wellbores. Example completion equipment includes sand screen completion equipment, multistage fracturing completion equipment, open hole completion equipment, and perforation completion equipment.

As another example, for each well, the training data 208a can include information regarding the results of the installation of the completion equipment. For example, the training data 208a can indicate whether the installations were successful or whether any problems were encountered during installation (for example, construction delays, accidents, safety risks, or other problems). As another example, the training data 208a can include information regarding the production of natural resources from each of the wells, such as the rate at which nature resources were extracted from the well, the quantity of natural resources that were extracted from the well, the ratio of a natural resource that was extracted from the well versus water, and the amount of sand (which may be undesirable) that was extracted from the well.

Further, the database module 202 can store wellbore data and/or sensor data 208b regarding a wellbore for which completion equipment is to be installed (e.g., the wellbore 108 shown in FIG. 1). The wellbore data and/or sensor data 208b can be used by the neural network 152 of the completion equipment performance system 150 to evaluate the suitability of each of several types of completion equipment for the wellbore, and to select a particular one of the types of completion equipment for installation at the wellbore. In some implementations, the wellbore data and/or sensor data 208*b* can be similar to the wellbore data 112 and the sensor data 114 described with respect to FIG. 1. Further, the wellbore data and/or sensor data 208*b* can include types of information similar to those of the training data 208*a*, but specific to a particular wellbore or site.

For example, for the wellbore 108, the wellbore data and/or sensor data 208*b* can include information regarding the characteristics of the wellbore 108, such as the dimensions of the wellbore 108 (for example, the diameter of the wellbore 108 and the depth to which the wellbore 108 extends) and the trajectory of the wellbore 108 (for example, whether the trajectory of a wellbore 108 is horizontal or vertical).

As another example, for the wellbore 108, the wellbore data and/or sensor data 208*b* can include information regarding the characteristics of the subsurface formation 116 through which the wellbore 108 extends. Example information includes the composition of the subsurface formation 116 (for example, whether the subsurface formation 116 includes sandstone, shale, or a combination thereof) and a porosity of the subsurface formation 116.

As another example, for the wellbore 108, the wellbore data and/or sensor data 208*b* can include information regarding the characteristics of one or more fluids or gases in the subsurface formation 116. Example information includes the density, the viscosity, the salinity, the composition, an American Petroleum Institute (API) gravity, and the concentration of the fluid or gas in the subsurface formation 116. In some implementations, the information can include the concentration of a particular substance in the subsurface formation 116 (for example, the centration of hydrogen sulfide gas).

In some implementations, at least some of the training data 208*a* can be collected by the computer systems 102*a*-102*c* and transmitted to the completion equipment performance system 150 (for example, via the network 106 and the communications module 204). For example, one or more of the computer systems 102*a*-102*c* can collect historical information regarding wells that were previously instructed, and transmit at least some of the collected information to the completion equipment performance system 150 for storage and further processing. In some implementations, at least some of the training data 208*a* can be manually input by one or more users. In some implementations, at least some of the training data 208*a* can be automatically collected, such as by one or more sensors (for example, one or more sensors similar to the sensors 104 deployed at one or more wells).

Similarly, in some implementations, at least some of the wellbore data and/or sensor data 208*b* can be collected by the computer systems 102*a*-102*c* and transmitted to the completion equipment performance system 150 (for example, via the network 106 and the communications module 204). For example, one or more of the computer systems 102*a*-102*c* can collect information regarding the wellbore 108, and transmit at least some of the collected information to the completion equipment performance system 150 for storage and further processing. In some implementations, at least some of the wellbore data and/or sensor data 208*b* can be manually input by one or more users. In some implementations, at least some of the wellbore data and/or sensor data 208*b* can be automatically collected, such as by the sensors 104.

Further, the database module 202 can store processing rules 208*c* specifying how data in the database module 202 can be processed to train a neural network 152 to evaluate and select completion equipment for wellbores. For instance, the processing rules 208*c* can specify that the training data 208*a* can be used by the completion equipment performance system 150 to train a neural network 152 to evaluate and select completion equipment for wellbores.

For example, the processing rules 208*c* can specify one more machine learning or artificial intelligence processes for identifying patterns, trends, or correlations in input data that are indicative of a particular type of completion equipment being suitable for installation at a wellbore having particular characteristics. As another example, the processing rules 208*c* can specify that at least a portion of the training data 208*a* be used as input data in the machine learning or artificial intelligence processes (for example, to provide "ground truth" examples that can aid in the identification of patterns or trends). Accordingly, the completion equipment performance system 150 can be trained to select completion equipment for new wells based on information regarding previously constructed wells. In some implementations, the processing rules 208*c* can specify that the neural network 152 be iteratively trained and re-trained with successive sets of training data 208*a* (for example, additional sets of training data 208*a* that are collected over time) to progressively improve its accuracy in selecting completion equipment. In some implementations, the processing rules 208*c* can specify that a training process be performed automatically by the completion equipment performance system 150 without manual user input.

As another example, the processing rules 208*c* can specify that the neural network 152 generate, for each of several types of completion equipment, one or more respective quality metrics that indicate an estimated likelihood of success of operating that type of completion equipment at the wellbore 108. As an example, if the quality metric for a particular type of completion equipment is relatively high, this can indicate that that particular type of completion equipment is more likely to be installed in the wellbore without problems or delays and/or is more likely to enable the extraction of natural resources in an efficient and effective manner. Conversely, if the quality metric for a particular type of completion equipment is relatively lower, this can indicate that that particular type of completion equipment is less likely to be installed in the wellbore without problems or delays and/or is less likely to enable the extraction of natural resources in an efficient and effective manner.

Example machine learning or artificial intelligence process are described in further detail below.

In some implementation, the processing rules 208*c* can specify that the quality metrics for each of several types of completion equipment to displayed to a user concurrently (for example, using a graphical user interface). This can be beneficial, for example, in enabling a user to assess the suitability of multiple types of completion equipment in an efficient and intuitive manner, such that he can select one of the types of completion equipment for installation at a particular wellbore.

In some implementation, the processing rules 208*c* can specify that the neural network 152 automatically select, from among the multiple types of completion equipment, a particular type for completion equipment to be installed at the wellbore. For example, the processing rules 208*c* can specify that the type of completion equipment having the highest quality metric be automatically selected. This can be beneficial, for example, in facilitating a rapid and efficient construction of a well, without relying on manual human input.

As described above, the completion equipment performance system 150 also includes a communications module 204. The communications module 204 allows for the transmission of data to and from the completion equipment performance system 150. For example, the communications module 204 can be communicatively connected to the network 106, such that it can transmit data to and receive data from each of the computer systems 102a-102c and the sensors 104. Information received from the computer systems 102a-102c and sensors 104 can be processed (for example, using the processing module 206) and stored (for example, using the database module 202).

As described above, the completion equipment performance system 150 also includes a processing module 206. The processing module 206 processes data stored or otherwise accessible to the completion equipment performance system 150. For instance, the processing module 206 can generate the neural network 152 to evaluate and select equipment for wellbores, given particular training data 208a and processing rules 208c. Further, the processing module 206 can determine an estimated likelihood of success of operating each of multiple types of completion equipment at a wellbore, based on the neural network 152 and given particular wellbore data and/or sensor data 208b.

Further, the processing module 206 can modify the neural network 152 based the training data 208a and the processing rules 208c. For example, as described above, the processing module 206 can perform one or more machine learning or artificial intelligence processes to identify patterns, trends, or correlations in input data that are indicative of a particular type of completion equipment being suitable for installation at a wellbore having particular characteristics. The identified patterns, trends, or correlations can be used to generate or modify one or more of the processing rules 208c for generating and updating the neural network 152 (for example, to distinguish between different use cases and outcomes in well construction). Further, as described above, at least a portion of the training data 208a can be used as input data in the machine learning or artificial intelligence processes. Further, as described above, the processing module 206 can perform the training processes iteratively using successive sets of training data 208a to progressively improve the neural network's accuracy in assessing and selecting completion equipment. In some implementations, this training process can be performed automatically by the processing module 206 without manual user input.

Figure 3:
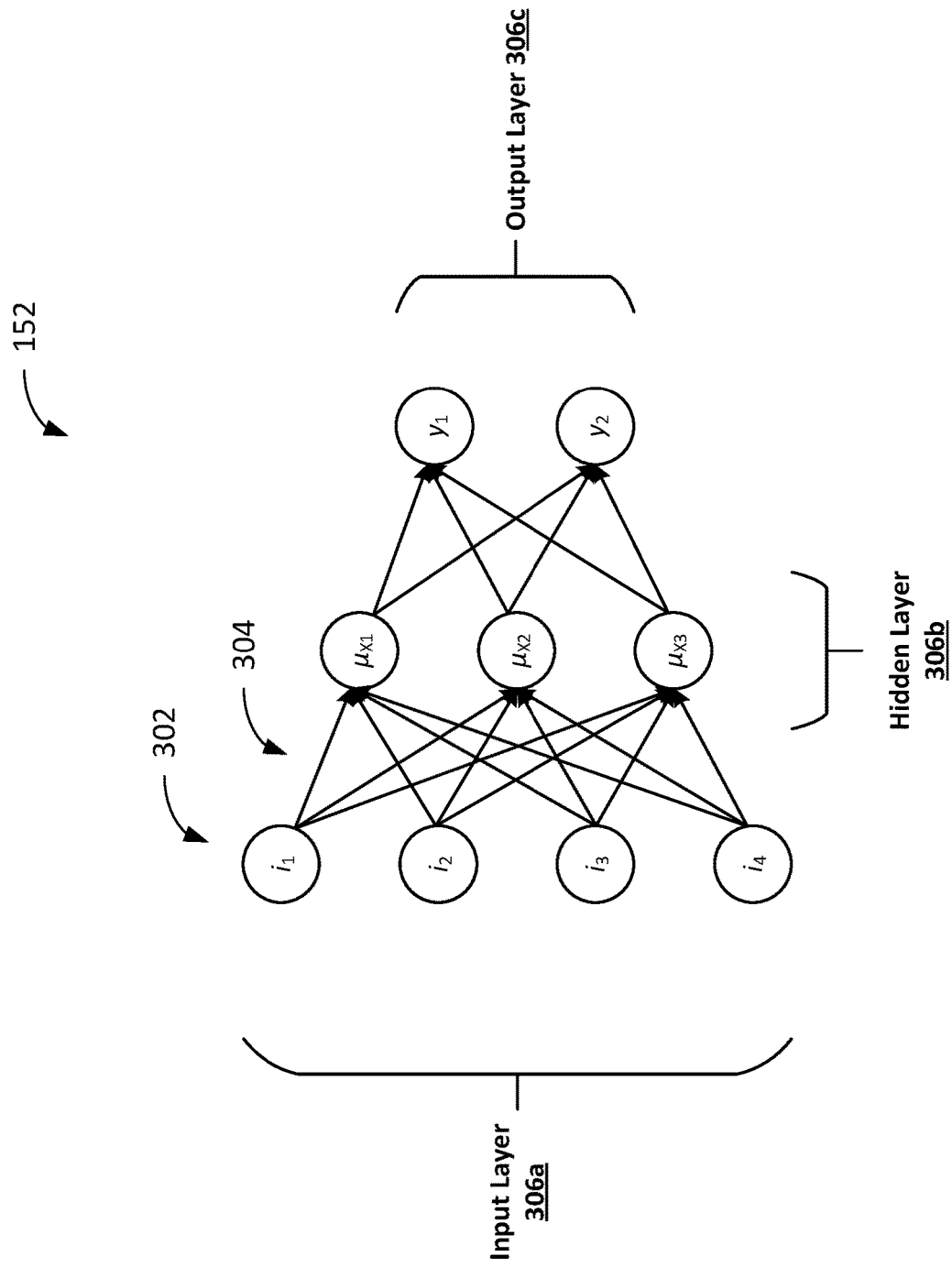
FIG. 3 is a diagram of an example neural network.

As described above, a machine learning or particular intelligence process can be performed using one or more neural networks 152. A simplified example of a neural network 152 is shown in FIG. 3.

The neural network 152 includes several nodes 302 (often called "neurons") interconnected with another by interconnections 304. Further, the nodes 302 are arranged according to multiple layers, including an input layer 306a, a hidden layer 306b, and an output layer 306c. The arrangement of the nodes 302 and the interconnections 304 between them represent a mathematical transformation of input data (for example, as received by the nodes of the input layer 306a) into corresponding output data (for example, as output by the nodes of the output layer 306c). In some implementations, the input data can represent one or more data points obtained by the completion equipment performance system 150, and the output data can represent one or more corresponding outcomes or decisions generated by the completion equipment performance system 150 based on the input data.

The nodes 302 of the input layer 306a receive input values and output the received input values to respective nodes of the next layer of the neural network 152. In this example, the neural network 152 includes several inputs $i_1$, $i_2$, $i_3$, and $i_4$, each of which receives a respective input value and outputs the received value to one or more of the nodes $\mu_{x1}$, $\mu_{x2}$, and $\mu_{x3}$ (for example, as indicated by the interconnections 304).

In some implementations, at least some of the information stored by the database module (for example, the wellbore data and/or sensor data 208b) can be used as inputs for the nodes of the input layer 306a. For example, at least some of the information stored by the database module can be expressed numerically (for example, assigned a numerical score or value), and input into the nodes of the input layer 306a.

The nodes of the hidden layer 306b receive input values (for example, from the nodes of the input layer 306a or nodes of other hidden layers), applies particular transformations to the received values, and outputs the transformed values to respective nodes of the next layer of the neural network 152 (for example, as indicated by the interconnections 304). In this example, the neural network 152 includes several nodes $\mu_{x1}$, $\mu_{x2}$, and $\mu_{x3}$, each of which receives respective input values from the nodes $i_1$, $i_2$, $i_3$, and $i_4$, applies a respective transformation to the received values, and outputs the transformed values to one or more of the nodes $y_1$ and $y_2$.

In some implementations, nodes of the hidden layer 306b can receive one or more input values, and transform the one or more received values according to a mathematical transfer function. As an example, the values that are received by a node can be used as input values in particular transfer function, and the value that is output by the transfer function can be used as the output of the node. In some implementations, a transfer function can be a non-linear function. In some implementations, a transfer function can be a linear function.

In some implementations, a transfer function can weight certain inputs differently than others, such that certain inputs have a greater influence on the output of the node than others. For example, in some implementations, a transfer function can weight each of the inputs by multiplying each of the inputs by a respective coefficient. Further, in some implementations, a transfer function can apply a bias to its output. For example, in some implementations, a transfer function can bias its output by a particular offset value.

For instance, a transfer function of a particular node can be represented as:

$$Y = \sum_{i=1}^{n} (weight_i * input_i) + \text{bias},$$

where $weight_i$ is the weight that is applied to an input $input_i$, bias is a bias or offset value is that is applied to the sum of the weighted inputs, and Y is the output of the node.

The nodes of the output layer 306c receive input values (for example from the nodes of the hidden layer 306b) and output the received values. In some implementations, nodes of the output layer 306c can also receive one or more input values, and transform the one or more received values according to a mathematical transfer function (for example, in a similar manner as the nodes of the hidden layer 306b). As an example, the values that are received by a node can be used as input values in particular transfer function, and the value that is output by the transfer function can be used as the output of the node. In some implementations, a transfer function can be a non-linear function. In some implementations, a transfer function can be a linear function.

In some implementations, each of the nodes of the output layer 306c can correspond to a different type of completion equipment, and can output a respective quality metric that indicates an estimated likelihood of success of operating that type of completion equipment at a wellbore. As an example, if the quality metric that is output by a node for a particular type of completion equipment is relatively high, this can indicate that that particular type of completion equipment is more likely to be installed in the wellbore without problems or delays and/or is more likely to enable the extraction of natural resources in an efficient and effective manner. Conversely, if the quality metric that is output by a node for a particular type of completion equipment is relatively lower, this can indicate that that particular type of completion equipment is less likely to be installed in the wellbore without problems or delays and/or is less likely to enable the extraction of natural resources in an efficient and effective manner.

In this example, the neural network 152 includes two output nodes $y_1$ and $y_2$, each of which receives respective input values from the nodes $\mu_{x1}$, $\mu_{x2}$, and $\mu_{x3}$, applies a respective transformation to the received values, and outputs the transformed values as outputs of the neural network 152.

Although FIG. 3 shows example nodes and example interconnections between them, this is merely an illustrative example. In practice, a neural network can include any number of nodes that are interconnected according to any arrangement. Further, although FIG. 3 shows a neural network 152 having a single hidden layer 306b, in practice, a network can include any number of hidden layers (for example, one, two, three, four, or more), or none at all.

Figure 4:
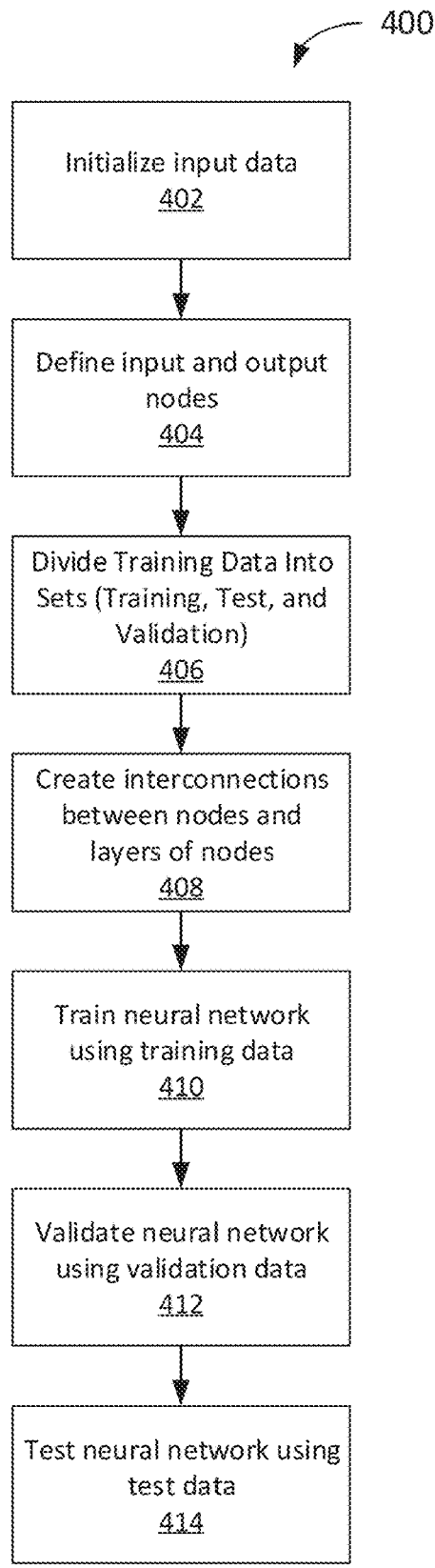
FIG. 4 is a flow chart diagram of an example process for training a neural network.

In some implementations, the neural network 152 can be trained based on training data, such as the training data 208a stored in the database module 202. An example process 400 for training the neural network 152 is shown in FIG. 4.

According to the process 400, the completion equipment performance system 150 initializes the input data that is used to train the neural network 152 (block 402). As an example, the completion equipment performance system 150 can retrieve at least a portion of the training data 208a, as described above.

Further, the completion equipment performance system 150 defines the input and the output nodes of the neural network 152 (block 404). For example, the completion equipment performance system 150 can select one or more of the types of data include in the training data 208a (for example, as described above), and specify that they be used as respective input nodes in the neural network 152 (for example, as inputs for respective nodes of the input layer 306a. As another example, the completion equipment performance system 150 can specify each of the outputs of the neural network (for example, the outputs of each of the nodes of the output layer 306c). For instance, each of the nodes of the output layer 306c can correspond to a different type of completion equipment, and can output a respective quality metric that indicates an estimated likelihood of success of operating that type of completion equipment at a wellbore.

The completion equipment performance system 150 divides the training data 208a into different sets (block 406). For example, the training data 208a can be divided into a training set, a validation set, and a test set.

The training set can be used to train the neural network 152. For example, the training set can be used to identify patterns, trends, or correlations between the inputs and the outputs of the neural network 152, and to express those relationships using the nodes and interconnections between them.

The validation set can be used to tune the performance of the trained neural network 152. For example, the validation set can be used to determine a difference between the output of the neural network 152 given certain inputs, and an expected output. The configuration of the neural network can be modified based on the different (for example, such that the output of the neural network 152 better matches the expected result).

The test set can be used to evaluate the performance of the trained neural network 152 (for instance, after it has been tuned based on the validation set). For example, the test set can be used to determine a difference between the output of the neural network 152 given certain inputs, and an expected output. This difference can indicate the ability of the neural network 152 to accurately predict a particular outcome (for example, the likelihood of success of operating each of multiple types of completion equipment at a wellbore) given particular inputs (for example, wellbore data and/or sensor data obtained regarding the wellbore).

Further, the completion equipment performance system 150 creates interconnections between the nodes and layers of nodes in of the neural network 152. In some implementations, an interconnection between two or more nodes can be in the forward direction (for example, data can be passed between nodes in the direction of the input to the output of the neural network 152). This may be referred to as a "feed forward" interconnection. In some implementations, an interconnection between two or more nodes can be in the backward direction (for example, data can be passed between nodes in the direction of the output to the input of the neural network 152). This may be referred to as a "back propagation" interconnection.

Further, the completion equipment performance system 150 creates layers of nodes. For example, the completion equipment performance system 150 can specify that the neural network include N layers of nodes, such as one input layer, one output layer, and N−2 hidden layers. Other arrangements of layers are also possible, depending on the implementation.

Further, the completion equipment performance system 150 trains the neural network 152 using the training set (block 410). In some implementations, the completion equipment performance system 150 to perform the training based on a supervised learning method. As an example, the training set can include example input data and output data. Based on the arrangement of the nodes and the interconnections between them, the completion equipment performance system 150 can identify transfer functions for each of the nodes that would result in the output of the neural network 152 matching or otherwise being similar to the output data in the training set, given the same input data. In some implementations, the completion equipment performance system 150 can select particular weights or biases for each of the transfer functions. In some implementations, this can be performed iteratively (for example, using successive sets of training data).

After training the neural network 152, the completion equipment performance system 150 validates the neural network 152 using the validation set (block 412). As an example, the validation set can include example input data and output data. The completion equipment performance system 150 can input the input data into the neural network 152, and compare the output of the neural network 152 to the output data of the validation set. In some implementations, the completion equipment performance system 150 can calculate an "error" of the neural network 152, such as the difference between the output data of the validation set and the output of the neural network 152.

In some implementations, the completion equipment performance system 150 can tune the neural network 152 based on the validation set. For example, the completion equipment performance system 150 can modify the arrangement of the nodes, the interconnections between them, and/or the transfer functions (for example, the weights and biases) such that the error of the neural network 152 is reduced.

In some implementations, this can be performed iteratively (for example, using successive sets of validation data) until particular criteria are met. For example, in some implementations, the completion equipment performance system 150 can iteratively tune the neural network 152 until the error of the neural network 152 is less than a particular threshold value.

After training and tuning the neural network 152, the completion equipment performance system 150 tests the neural network 152 using the test set (block 414). As an example, the test set can include example input data and output data. The completion equipment performance system 150 can input the input data into the neural network 152, and compare the output of the neural network 152 to the output data of the test set. In some implementations, the completion equipment performance system 150 can calculate an "error" of the neural network 152, such as the difference between the output data of the test set and the output of the neural network 152. This error can represent the predictive performance of the neural network. For example, a high error can indicate that the neural network 152 is less likely to predict an outcome accurately, given certain input data. Conversely, lower error can indicate that the neural network 152 is more likely to predict an outcome accurately, given certain input data.

FIGS. 5A and 5B show example graphical user interfaces (GUI) that enable a user to interact with a system for evaluating and selecting completion equipment for wellbores using a neural network.

For example, FIG. 5A shows an example GUI 500 that can be presented for a user of the system 100. The GUI 500 can be presented, for example, by any of the computer systems 102a-102c.

The GUI 500 includes a data input portion 502 for receiving input data from a user regarding a wellbore. For example, data input portion 502 can indicate several categories of data that can be input by the user regarding a wellbore, and provide user interface elements (for example, text boxes, pull down menus, pop up menus, or other elements) that enable the user to provide the appropriate data. Example categories of data are described above (for example, in connection with FIGS. 1 and 2).

When the user is satisfied with his inputs, the user can select a user interface element 504 (for example, a button) to confirm his input. In response, the completion equipment performance system 150 provides the user's inputs to the neural network 152, and determines the corresponding output of the neural network 152. As an example, referring to FIG. 3, each of the user's inputs can be inputted into one or more of the nodes of the input layer 306a, and the outputs of the nodes of the output layer 306c can correspond to the output of the neural network 152. As described above, each of the nodes of the output layer 306c can correspond to a different type of completion equipment, and can output a respective quality metric that indicates an estimated likelihood of success of operating that type of completion equipment at a wellbore.

In some implementations, the completion equipment performance system 150 can automatically select a particular type of completion equipment for deployment at the wellbore based on the output of the neural network 152. Further, the completion equipment performance system 150 can present the selected type of completion equipment in a data output portion 506 of the GUI 500, such that the user can review the selection. As an example, the completion equipment performance system 150 can automatically select the type of completion equipment having the highest quality metric, and present the selection of the user.

As shown in FIG. 5A, in some implementations, the data output portion 506 can include an indication of the selected type of completion equipment. Further, the data output portion 506 can include additional information regarding the selected type of completion equipment, such as technical specification regarding the selected type of completion equipment and "best practices" for implementing the selected type of completion equipment (for example, recommended procedures for installing and operating the selected type of completion equipment).

In some implementations, the completion equipment performance system 150 can display information regarding whether the selected type of completion equipment is available for development. As an example, using the GUI 500, the completion equipment performance system 150 can indicate that a particular type of completion equipment is "active" and is available for installation. As another example, using the GUI 500, the completion equipment performance system 150 can indicate a particular type of completion equipment is "on hold," such if the completion equipment is unavailable or if deployment of the completion equipment is restricted for other reasons (for example, a recent failure involving the completion equipment). As another example, using the GUI 500, the completion equipment performance system 150 can indicate a particular type of completion equipment is "new," such if the completion equipment has not previously been installed in a production environment, but is otherwise available for deployment.

In some implementations, the completion equipment performance system 150 can automatically identify multiple types of completion equipment for deployment at the wellbore based on the output of the neural network 152 (for example, the types of completion equipment having the N highest quality metrics). Further, the completion equipment performance system 150 can present each of the identified types of completion equipment in a data output portion 504 of the GUI 500. The user can select one of the presented types of 5010 (for example, a button). In response, the completion equipment performance system 150 can display additional information regarding the selected type of completion equipment, such as technical specification regarding the selected type of completion equipment, "best practices" for implementing the selected type of completion equipment, and whether the selected type of completion equipment is available for development.

In some implementations, the completion equipment performance system 150 can display quality metrics for each of several types of completion equipment to a user concurrently. This can be beneficial, for example, in enabling a user to assess the suitability each of multiple types of completion equipment for a particular wellbore in an efficient and intuitive manner, such that he can select one of the types of completion equipment for installation at a particular wellbore.

For example, FIG. 5B shows another example GUI 510. In this example, the GUI 510 includes information regarding two different wellbores (for example "Well 1" and "Well 2"). For each wellbore, the GUI 510 indicates several categories of data (for example, the name of the wellbore, the coordinates of the wellbore, the well application, the well trajectory, the formation type, and the depth interval). Further, for each wellbore, the GUI 510 indicates quality metrics associated with each of four different types of completion equality (for example, sand screen completion equipment, multistage fracturing (MSF) completion equipment, open hole completion equipment, and perforation completion equipment). Based on this information, the user can intuitively identify sand screen completion equipment as most suitable for deployment at first wellbore (for example, "Well 1") and MSF completion equipment as best suitable for deployment at the second wellbore (for example, "Well 1").

In some implementations, for each wellbore, the completion equipment performance system 150 can indicate a selection of one of the types of completion equipment for deployment at the wellbore. For example, referring to FIG. 5B, the GUI 510 can highlight the type of completion equipment having the highest quality metric or display some other graphical indication (for example, icon such as a star).

Although example types of data and example types of completion equipment are shown in FIGS. 5A and 5B, these are merely illustrative examples. In practice, the completion equipment performance system 150 can receive any type of data as input (for example, from a user, sensors, or computer system), and can output data regarding any type of completion equipment based on the neural network 152.

Example Processes

Figure 6:
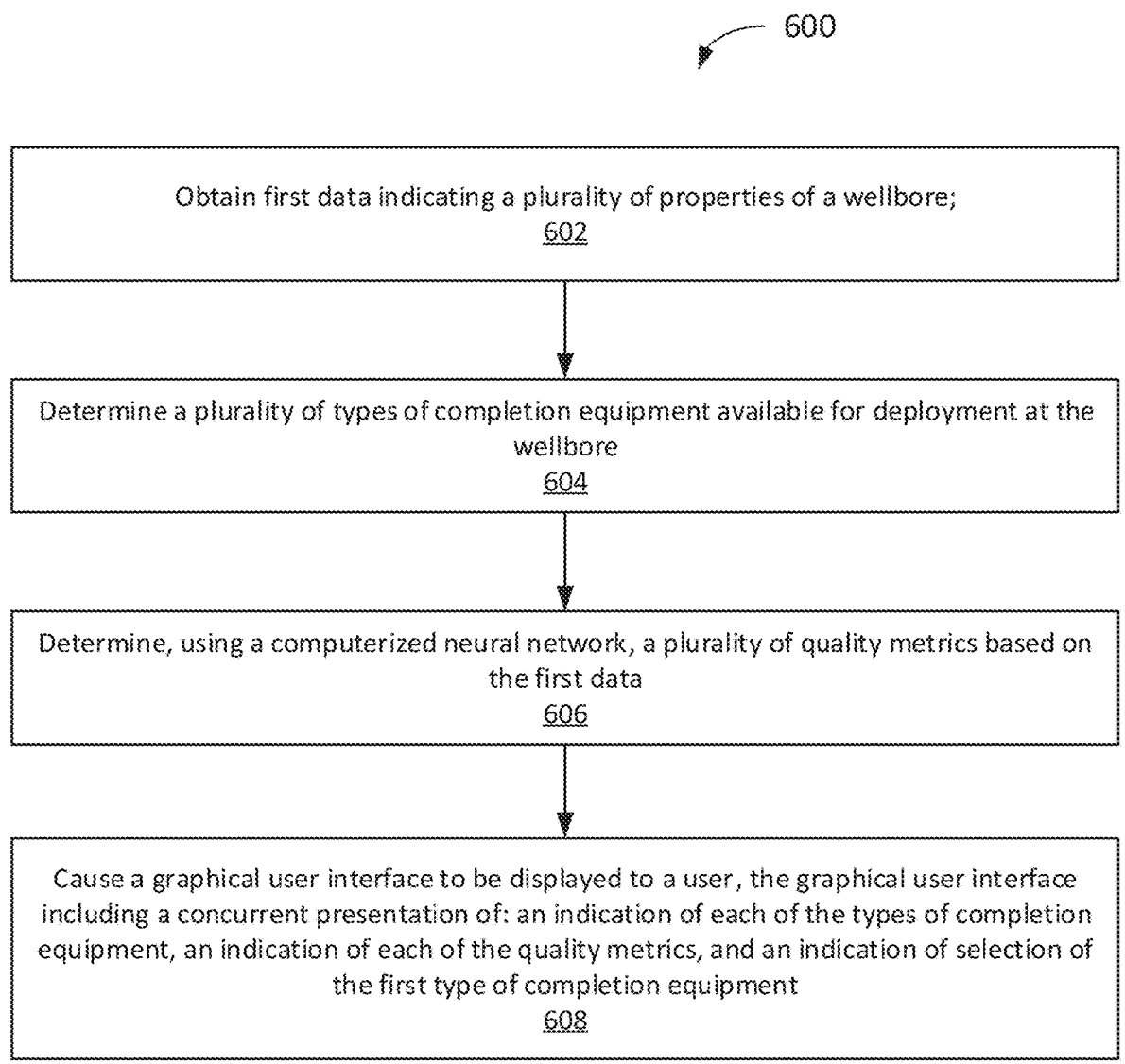
FIG. 6 is a flow chart diagrams of example processes for evaluating and selecting completion equipment for wellbores using a neural network.

An example process 600 for evaluating and selecting completion equipment for wellbores using a neural network is shown in FIG. 6. In some implementations, the process 600 can be performed by the completion equipment performance systems described in this disclosure (for example, the completion equipment performance system 150 shown and described with respect to FIGS. 1, and 2) using one or more processors (for example, using the processor or processors 710 shown in FIG. 7).

In the process 600, a system obtains first data indicating a plurality of properties of a wellbore is (block 602). In some implementations, at least some of the first data can be obtained by one or more sensors deployed at the wellbore (for example, the sensors 104 shown in FIG. 1). In some implementations, at least some of the first data can be received from the user via the graphical user interface (for example, the GUI 500 shown in FIG. 5A).

Example first data as described above, for instance with reference to the wellbore data 112, the sensor data 114, and the wellbore data and/or sensor data 208b shown in FIGS. 1 and 2.

For example, obtaining the first data can include determining an indication of a resource to be obtained from the wellbore. In some implementations, the resource can be at least one of oil or gas.

As another example, obtaining the first data can include determining a trajectory of the wellbore. In some implementations, the trajectory can be horizontal or vertical.

As another example, obtaining the first data can include determining a composition of a formation through which the wellbore extends. In some implementations, the composition can include at least one of sandstone or shale.

As another example, obtaining the first data can include determining a depth of the wellbore.

As another example, the first data can include an indication of at least one of a density, a viscosity, an American Petroleum Institute (API) gravity, or a salinity of fluid in the wellbore.

As another example, obtaining the first data can include determining a concentration of a gas in the wellbore. In some implementations, the gas can be hydrogen sulfide.

Although example first data is described above, these are merely illustrative examples. In practice, other data regarding a wellbore and/or a site of the wellbore can be obtained, either instead of or in addition to the information described above.

The system determines a plurality of types of completion equipment available for deployment at the wellbore (block 604). In some implementations, types of completion equipment can include one or more of sand screen completion equipment, multistage fracturing completion equipment, open hole completion equipment, or perforation completion equipment.

The system determines, using a computerized neural network, a plurality of quality metrics based on the first data (block 606). Each of the quality metrics represents an estimated likelihood of success of operating a respective one of the types of completion equipment at the wellbore. Example neural networks are described above, for instance with reference to FIG. 3.

In some implementations, determining the plurality of quality metrics can include determining an estimated likelihood of success of operating each of sand screen completion equipment, multistage fracturing completion equipment, open hole completion equipment, or perforation completion equipment at the wellbore.

The system causes a graphical user interface to be displayed to a user (block 608). The graphical user interface includes a concurrent presentation of an indication of each of the types of completion equipment and an indication of each of the quality metrics. Example graphical user interfaces are shown in FIGS. 5A and 5B.

In some implementations, the system can select a first type of completion equipment from among the types of completion equipment for deployment at the wellbore based on the quality metrics. Further, the graphical user interface can include an indication of selection of the first type of completion equipment. In some implementations, the indication of the selection of the first type of completion equipment can be displayed concurrently with the indication of each of the types of completion equipment and/or the indication of each of the quality metrics.

In some implementations, the system can train the computerized neural network based on second data regarding one or more additional wellbores. The second data can include, for each of the additional wellbores: an indication of a plurality of properties of the additional wellbore, an indication of one of the types of completion equipment deployed at the additional wellbore, and an indication of an additional quality metric for the type of completion equipment deployed at the additional wellbore.

Example techniques for training a neural network are described with above, for instance with reference to FIGS. 3 and 4. For example, in some implementations, training the computerized neural network can include determining a transfer function based on the second data. The transfer function can define a relationship between a plurality of inputs to the computerized neural network and a plurality of outputs of the computerized neural network. Further, each of the inputs can correspond to a different respect one of the properties of the wellbore. Further, each of the outputs can correspond to a different one of the quality metrics. In implementations, the transfer function can define one or more weights associated with determining the outputs based on the inputs.

Example Systems

Some implementations of the subject matter and operations described in this specification can be implemented in digital electronic circuitry, or in computer software, firmware, or hardware, including the structures disclosed in this specification and their structural equivalents, or in combinations of one or more of them. For example, in some implementations, one or more components of the system 100 and completion equipment performance system 150 can be implemented using digital electronic circuitry, or in computer software, firmware, or hardware, or in combinations of one or more of them. In another example, the processes 400 and 600 shown in FIGS. 5 and 6 can be implemented using digital electronic circuitry, or in computer software, firmware, or hardware, or in combinations of one or more of them.

Some implementations described in this specification can be implemented as one or more groups or modules of digital electronic circuitry, computer software, firmware, or hardware, or in combinations of one or more of them. Although different modules can be used, each module need not be distinct, and multiple modules can be implemented on the same digital electronic circuitry, computer software, firmware, or hardware, or combination thereof.

Some implementations described in this specification can be implemented as one or more computer programs, that is, one or more modules of computer program instructions, encoded on computer storage medium for execution by, or to control the operation of, data processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (for example, multiple CDs, disks, or other storage devices).

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, for example, an FPGA (field programmable gate array) or an ASIC (application specific integrated circuit). The apparatus can also include, in addition to hardware, code that creates an execution environment for the computer program in question, for example, code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages. A computer program may, but need not, correspond to a file in a file system. A program can be stored in a portion of a file that holds other programs or data (for example, one or more scripts stored in a markup language document), in a single file dedicated to the program in question, or in multiple coordinated files (for example, files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can also be implemented as, special purpose logic circuitry, for example, an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read only memory or a random access memory or both. A computer includes a processor for performing actions in accordance with instructions and one or more memory devices for storing instructions and data. A computer can also include, or be operatively coupled to receive data from or transfer data to, or both, one or more mass storage devices for storing data, for example, magnetic, magneto optical disks, or optical disks. However, a computer need not have such devices. Devices suitable for storing computer program instructions and data include all forms of non-volatile memory, media and memory devices, including by way of example semiconductor memory devices (for example, EPROM, EEPROM, AND flash memory devices), magnetic disks (for example, internal hard disks, and removable disks), magneto optical disks, and CD-ROM and DVD-ROM disks. The processor and the memory can be supplemented by, or incorporated in, special purpose logic circuitry.

To provide for interaction with a user, operations can be implemented on a computer having a display device (for example, a monitor, or another type of display device) for displaying information to the user. The computer can also include a keyboard and a pointing device (for example, a mouse, a trackball, a tablet, a touch sensitive screen, or another type of pointing device) by which the user can provide input to the computer. Other kinds of devices can be used to provide for interaction with a user as well. For example, feedback provided to the user can be any form of sensory feedback, such as visual feedback, auditory feedback, or tactile feedback. Input from the user can be received in any form, including acoustic, speech, or tactile input. In addition, a computer can interact with a user by sending documents to and receiving documents from a device that is used by the user. For example, a computer can send webpages to a web browser on a user's client device in response to requests received from the web browser.

A computer system can include a single computing device, or multiple computers that operate in proximity or generally remote from each other and typically interact through a communication network. Examples of communication networks include a local area network ("LAN") and a wide area network ("WAN"), an inter-network (for example, the Internet), a network including a satellite link, and peer-to-peer networks (for example, ad hoc peer-to-peer networks). A relationship of client and server can arise by virtue of computer programs running on the respective computers and having a client-server relationship to each other.

Figure 7:
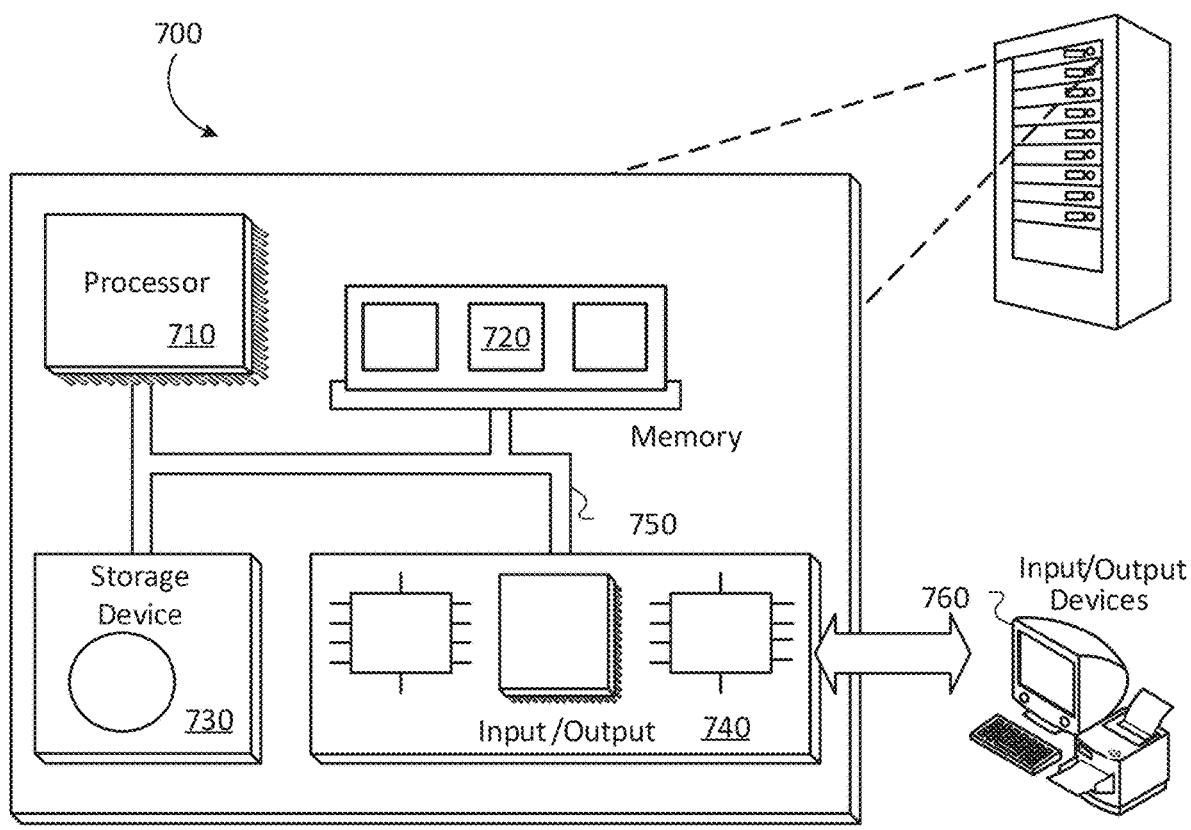
FIG. 7 is a schematic diagram of an example computer system.

FIG. 7 shows an example computer system 700 that includes a processor 710, a memory 720, a storage device 730 and an input/output device 740. Each of the components 710, 720, 730 and 740 can be interconnected, for example, by a system bus 750. The processor 710 is capable of processing instructions for execution within the system 700. In some implementations, the processor 710 is a single-threaded processor, a multi-threaded processor, or another type of processor. The processor 710 is capable of processing instructions stored in the memory 720 or on the storage device 730. The memory 720 and the storage device 730 can store information within the system 700.

The input/output device 740 provides input/output operations for the system 700. In some implementations, the input/output device 740 can include one or more of a network interface device, for example, an Ethernet card, a serial communication device, for example, an RS-232 port, or a wireless interface device, for example, an 802.11 card, a 3G wireless modem, a 4G wireless modem, or a 5G wireless modem, or both. In some implementations, the input/output device can include driver devices configured to receive input data and send output data to other input/output devices, for example, keyboard, printer and display devices 760. In some implementations, mobile computing devices, mobile communication devices, and other devices can be used.

While this specification contains many details, these should not be construed as limitations on the scope of what may be claimed, but rather as descriptions of features specific to particular examples. Certain features that are described in this specification in the context of separate implementations can also be combined. Conversely, various features that are described in the context of a single implementation can also be implemented in multiple embodiments separately or in any suitable sub-combination.

A number of embodiments have been described. Nevertheless, various modifications can be made without departing from the spirit and scope of the invention. Accordingly, other embodiments are within the scope of the claims.

What is claimed is:

1. A method comprising:
    obtaining, using one or more processors, first data indicating a plurality of properties of a wellbore;
    determining, using the one or more processors, a plurality of types of completion equipment available for deployment at the wellbore;
    determining, using the one or more processors implementing a computerized neural network, a plurality of quality metrics based on the first data, wherein each of the quality metrics represents an estimated likelihood of success of operating a respective one of the types of completion equipment at the wellbore; and
    causing, using the one or more processors, a graphical user interface to be displayed to a user, the graphical user interface comprising a concurrent presentation of:
        an indication of each of the types of completion equipment, and
        an indication of each of the quality metrics,
    wherein the computerized neural network comprises a plurality of interconnected nodes, including:
        a plurality of input nodes,
        a plurality of output nodes, and
        a plurality of weighted nodes interconnecting the plurality of input nodes and the plurality of output nodes,
    wherein the computerized neural network is trained based on second data regarding one or more additional wellbores, wherein the second data comprises, for each of the additional wellbores:
        an indication of a plurality of properties of the additional wellbore,
        an indication of one of the types of completion equipment deployed at the additional wellbore, and
        an indication of an additional quality metric for the type of completion equipment deployed at the additional wellbore, and
    wherein training the computerized neural network comprises determining a transfer function based on the second data,
    wherein the transfer function defines a relationship between the plurality of input nodes and the plurality of output nodes according to the plurality of weighted nodes,
    wherein each of the input nodes corresponds to a different respect one of the properties of the wellbore, and
    wherein each of the output nodes corresponds to a different one of the quality metrics.

2. The method of claim 1, further comprising:
    selecting, using the one more processors based on the quality metrics, a first type of completion equipment from among the types of completion equipment for deployment at the wellbore, and
    wherein the graphical user interface further comprises an indication of selection of the first type of completion equipment.

3. The method of claim 1, wherein the transfer function defines one or more weights associated with determining the outputs based on the inputs.

4. The method of claim 1, wherein obtaining the first data comprises determining an indication of a resource to be obtained from the wellbore.

5. The method of claim 4, wherein the resource is at least one of oil or gas.

6. The method of claim 1, wherein obtaining the first data comprises determining a trajectory of the wellbore.

7. The method of claim 6, wherein the trajectory is horizontal or vertical.

8. The method of claim 1, wherein obtaining the first data comprises determining a composition of a formation through which the wellbore extends.

9. The method of claim 8, wherein the composition comprises at least one of sandstone or shale.

10. The method of claim 1, wherein obtaining the first data comprises determining a depth of the wellbore.

11. The method of claim 1, wherein the first data comprises an indication of at least one of a density, a viscosity, an American Petroleum Institute (API) gravity, or a salinity of fluid in the wellbore.

12. The method of claim 1, wherein obtaining the first data comprises determining a concentration of a gas in the wellbore.

13. The method of claim 12, wherein the gas is hydrogen sulfide.

14. The method of claim 1, wherein determining the plurality of quality metrics comprises determining an estimated likelihood of success of operating each of sand screen completion equipment, multistage fracturing completion equipment, open hole completion equipment, or perforation completion equipment at the wellbore.

15. The method of claim 1, wherein at least some of the first data obtained by one or more sensors deployed at the wellbore.

16. The method of claim 1, wherein at least some of the first data is received from the user via the graphical user interface.

17. A system comprising:
one or more processors; and
one or more non-transitory computer readable media storing instructions that, when executed by the one or more processors, cause the one or more processors to perform operations comprising:
obtaining first data indicating a plurality of properties of a wellbore;
determining a plurality of types of completion equipment available for deployment at the wellbore;
determining, using a computerized neural network, a plurality of quality metrics based on the first data, wherein each of the quality metrics represents an estimated likelihood of success of deploying a respective one of the types of completion equipment at the wellbore;
selecting, based on the quality metrics, a first type of completion equipment from among the types of completion equipment for deployment at the wellbore; and
causing a graphical user interface to be displayed to a user, the graphical user interface comprising:
an indication of each of the types of completion equipment,
an indication of each of the quality metrics, and
an indication of selection of the first type of completion equipment,
wherein the computerized neural network comprises a plurality of interconnected nodes, including:
a plurality of input nodes,
a plurality of output nodes, and
a plurality of weighted nodes interconnecting the plurality of input nodes and the plurality of output nodes,
wherein the computerized neural network is trained based on second data regarding one or more additional wellbores, wherein the second data comprises, for each of the additional wellbores:
an indication of a plurality of properties of the additional wellbore,
an indication of one of the types of completion equipment deployed at the additional wellbore, and
an indication of an additional quality metric for the type of completion equipment deployed at the additional wellbore, and
wherein training the computerized neural network comprises determining a transfer function based on the second data,
wherein the transfer function defines a relationship between the plurality of input nodes and the plurality of output nodes according to the plurality of weighted nodes, wherein each of the input nodes corresponds to a different respect one of the properties of the wellbore, and
wherein each of the output nodes corresponds to a different one of the quality metrics.

18. One or more non-transitory computer readable media storing instructions that, when executed by one or more processors, cause the one or more processors to perform operations comprising:
obtaining first data indicating a plurality of properties of a wellbore;
determining a plurality of types of completion equipment available for deployment at the wellbore;
determining, using a computerized neural network, a plurality of quality metrics based on the first data, wherein each of the quality metrics represents an estimated likelihood of success of deploying a respective one of the types of completion equipment at the wellbore;
selecting, based on the quality metrics, a first type of completion equipment from among the types of completion equipment for deployment at the wellbore; and
causing a graphical user interface to be displayed to a user, the graphical user interface comprising:
an indication of each of the types of completion equipment,
an indication of each of the quality metrics, and
an indication of selection of the first type of completion equipment, and
wherein the computerized neural network comprises a plurality of interconnected nodes, including:
a plurality of input nodes,
a plurality of output nodes, and
a plurality of weighted nodes interconnecting the plurality of input nodes and the plurality of output nodes,
wherein the computerized neural network is trained based on second data regarding one or more additional wellbores, wherein the second data comprises, for each of the additional wellbores:
an indication of a plurality of properties of the additional wellbore,
an indication of one of the types of completion equipment deployed at the additional wellbore, and
an indication of an additional quality metric for the type of completion equipment deployed at the additional wellbore, and
wherein training the computerized neural network comprises determining a transfer function based on the second data,
wherein the transfer function defines a relationship between the plurality of input nodes and the plurality of output nodes according to the plurality of weighted nodes,
wherein each of the input nodes corresponds to a different respect one of the properties of the wellbore, and
wherein each of the output nodes corresponds to a different one of the quality metrics.

* * * * *